United States Patent [19]
Kennedy et al.

[11] Patent Number: 5,517,686
[45] Date of Patent: May 14, 1996

[54] DIVERSITY RECEIVER FOR FM STEREO UTILIZING A PILOT TONE MULTIPLE FOR PHASE ALIGNMENT OF RECEIVED SIGNALS

[75] Inventors: Richard A. Kennedy; Barry F. Koch, both of Kokomo, Ind.

[73] Assignee: Delco Electronics Corporation, Kokomo, Ind.

[21] Appl. No.: 314,123

[22] Filed: Sep. 29, 1994

[51] Int. Cl.$^6$ ........................................ H04B 7/08
[52] U.S. Cl. ................... 455/273; 455/276.1; 455/289; 455/304
[58] Field of Search ..................... 455/437, 439, 455/273, 275, 276.1, 277.1, 278.1, 285, 289, 302, 304; 381/13, 4

[56] References Cited

U.S. PATENT DOCUMENTS 2,951,152  8/1960  Sichak et al. .................... 455/273
5,204,979  9/1993  Schenkyr et al. ................. 455/304 X Primary Examiner—Chi H. Pham
Attorney, Agent, or Firm—Jimmy L. Funke

[57] ABSTRACT

An FM stereo receiving system and a method for aligning phases of RF signals received by multiple antennas. The FM stereo receiving system includes two antennas for receiving RF signals having a common frequency but potentially different phases. The system also includes an FM receiver having a detector output and a pilot output on which a pilot tone, such as a 19 kHz pilot tone, is present. A summer is included in the system for summing the RF signals and providing the summed signal to the receiver. The amplitude modulator of the system resides between one of the antennas and the summer to amplitude modulate the antenna's RF signal at a perturbation frequency which is a whole number multiple greater than 1 of the pilot tone. The receiver thus produces on its phase detector output a phase signal having a frequency equal to the perturbation frequency and a magnitude corresponding to the phase error between the RF signals which is connected in a feedback loop to align the phases.

9 Claims, 3 Drawing Sheets

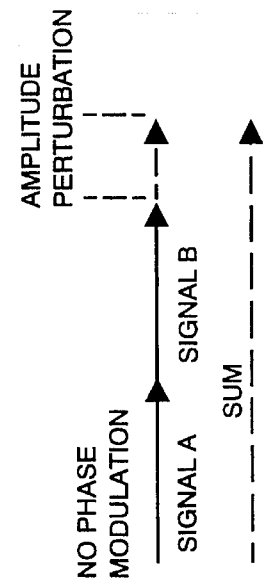
Fig. 2
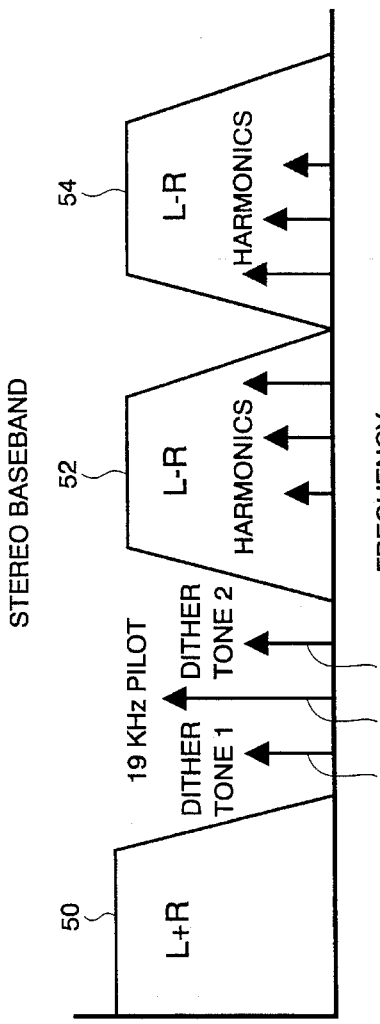
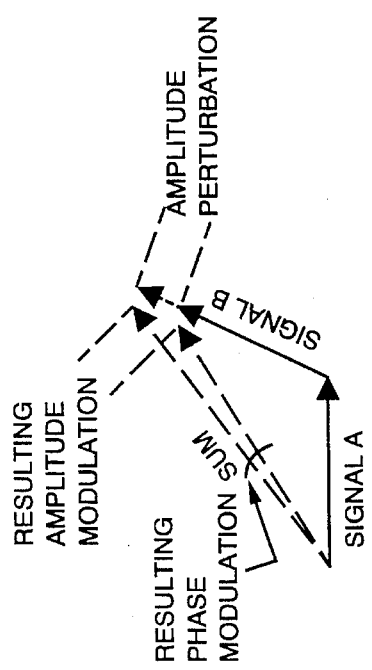
Fig. 1A
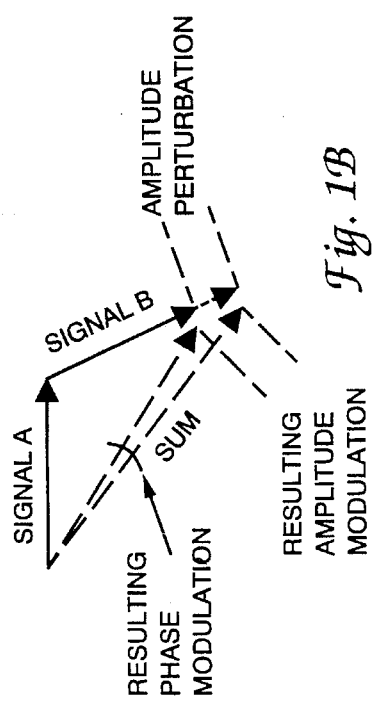
Fig. 1B
Fig. 1C

DIVERSITY RECEIVER FOR FM STEREO UTILIZING A PILOT TONE MULTIPLE FOR PHASE ALIGNMENT OF RECEIVED SIGNALS

BACKGROUND OF THE INVENTION

1. Field of the Invention

The present invention relates to an FM stereo receiving system, and, more particularly, to an adaptive control for combining FM stereo signals received from multiple antennas.

2. Description of the Related Art

Traditionally, vehicles have been equipped with a mast antenna for the receipt of radio signals. Mast antennas are viewed as having shortcomings; therefore, efforts have been made to discover viable alternatives to the mast antenna. With regard to its shortcomings, the mast antenna may interfere with the desired styling of the vehicle; is susceptible to damage as when the vehicle passes by a low branch, by an act of vandalism, or by a simple accident; and has limitations in terms of its reception quality.

To address the issue of a mast antenna interfering with the vehicle's styling, antennas have been placed within the vehicle's glass, such as the windshield. Considering performance limitations, a single antenna, whether a mast antenna, an in-glass antenna, or other type of antenna, is generally susceptible to fading and multipath signal interference resulting from an obstruction such as might be caused by the presence of a building, a mountain, another vehicle, or the like. Alternatives to the whip antenna such as "in glass" antennas are typically somewhat more susceptible to fading and multipath due to their gain, directivity and polarization properties. Therefore, as alternative antennas are introduced there is increased need for other means of enhancing reception. Several techniques have been developed using multiple antennas for receipt of the radio signals to reduce the effect of such fading and interference. These techniques include scanning/selection, equal-gain combining, and maximal-ratio combining.

The scanning/selection technique is one which operates on the premise that if one antenna disposed on the vehicle is receiving a poor signal, another antenna spaced from the first antenna may be receiving a better signal. In scanning/selection systems, only one antenna is used for receipt of the signal at any particular point in time. The system either compares the signals received by the system's antennas to ascertain which antenna is receiving the better signal, or the system evaluates the signal being received to determine the quality of the signal and simply switch to another antenna if the current signal is designated as unacceptable. Though scanning/selection systems are generally an improvement over a single antenna system, the improvement is less than that obtained by more sophisticated methods. Also, the switching transients caused by switching between antennas can be audible under some circumstances. Further, because only one antenna is used at a point in time, the system provides only marginal improvement during fringe reception.

The equal-gain combining technique combines signals received by the antennas of an antenna array by correcting for the phase differences between antennas then adding the signals vectorially. No adjustments are made to the signals for any difference in the gains of the input signals. Because only the phases of the input signals are adjusted for alignment in an equal-gain system, it is possible that signal to noise may be less than optimal. For example, if two inputs are combined and one of those inputs contain mostly noise, the combined signal is likely to be of lower quality than the single non-corrupted signal.

The maximal-ratio combining technique is a further improvement over the equal-gain combining technique in that, in addition to adjusting of the input signals according to the detected phases thereof, the magnitudes of the input signals are also adjusted to yield the maximum signal-to-noise ratio. In this manner, a signal which is corrupted with noise does not degrade the overall performance of the system. Though the maximal-ratio combining technique results in an improved signal over that of the equal-gain combining technique, the cost of implementing such a system is prohibitive in some environments. The hardware complexity is typically that of having complete multiple receivers plus the combined algorithm.

In practice a switched diversity system is fairly easy to implement but offers limited improvement. The maximal-ratio combining technique offers the most improvement but at very high hardware cost. The equal-gain combining technique offers system performance just below that of the optimal-ratio technique. This is a good compromise position, particularly if we can develop techniques which have efficient hardware implementation methods, and allow combining the signals at RF or early in the IF stream. This approach is the key to efficient implementation by minimizing the excess hardware required.

In the early 1960's, an equal-gain combining technique was developed which permitted phase alignment at the radio frequency (RF) (Lewin, "Diversity Reception and Automatic Phase Correction," Proc. of IEEE, Paper No. 3584E, Vol. 9, Part B., No. 46, page 295–304, July 1962). In Lewin, a phase changer was disclosed for use in a an adaptive system. The phase changer both sensed and corrected phase. Specifically, phase perturbation is introduced and the resulting amplitude modulation is detected. Based on the work of Lewin, others developed similar techniques for amplitude modulated (AM) receivers (Parsons et al., "Space Diversity Reception for VHF Mobile Radio," Electronic Letters, Vol. 7, No. 22, pages 655–56, Nov. 4, 1971). For frequency modulated (FM) receivers, a related technique was developed (Parsons et al., "Self-Phasing Aerial Array for F.M. Communication Links," Electronic Letters, Vol. 7, No. 13, pages 380–81, Jul. 1, 1971). In the system described in Parsons, amplitude perturbation is introduced which results in phase modulated components of the sum signal which are proportional to the relative phases of the input signals. This phase perturbation is then detected and used in a feedback loop to control phase shifters and bring the input signals into phase alignment. Of course the perturbation frequency must be outside the modulation bandwidth to avoid interference with a legitimate FM signal.

To date, application of the perturbation equal-gain combining technique has been limited to systems with a simple modulation spectrum such as AM and monophonic FM. This is due to the requirement that the perturbation frequencies be placed such that they do not introduce artifacts into the systems modulation band, and that the system's modulation does not interfere with the perturbation system. The technique is advantageous over the scanning/selection technique for reasons previously discussed herein, and is much less costly to implement than are systems using the numerous maximal-ratio techniques but there are practical limitations to its usefulness. It is therefore desirable to provide a similar perturbation equal-gain combining technique applicable to complex multi-spectra communication systems, such as FM stereo.

It will be appreciated that placement of the perturbations introduced in a multi-spectra communication system such as FM stereo is more complex than in a single spectrum system. The potential for interference caused by the perturbations and any harmonics or intermodulation products generated therefrom is greater in a multi-spectra communication system. For FM, the perturbations should not cause interference with the FM monophonic band, the stereo bands or other communication bands such as radio data system information transmitted at frequencies greater than that of the FM stereo band. The challenge is to locate the perturbation frequencies in a position on the frequency spectrum where interference will not occur.

SUMMARY OF THE INVENTION

The present invention provides an FM stereo receiving system comprising a plurality of antennas and a method for aligning the phases of all of the RF signals received by multiple antennas. Both the system and the method eliminate the phase errors between all of the RF signals received.

The invention comprises, in one form thereof, an FM stereo receiving system including two antennas, an FM receiver, a means for summing RF signals, an amplitude modulator, and a controllable phase shifter means. The antennas receive respective RF signals having a common frequency but potentially different phases. The FM receiver includes a phase detector output and a pilot output on which a pilot tone is present. The summing means is for summing the RF signals from the antennas and inputs the summed signal into the receiver. Connected between one of the antennas and the summing means is an amplitude modulator means for modulating the RF signal of that antenna at a perturbation frequency that is a whole number multiplier greater than 1 of the (19 kHz) pilot tone. The FM receiver produces on its phase detector output a phase signal having a frequency equal to the perturbation frequency and a magnitude corresponding to the phase error between the RF signals. The system's controllable phase shifter means is connected between the antenna whose RF signal is modulated and the summing means. The phase shifter means is responsive to the phase detector output signal for shifting the phase of the signal received by that antenna by an amount sufficient to eliminate the phase error between the two RF signals.

In another embodiment thereof, the FM stereo system comprises a plurality N of antennas, N - 1 amplitude modulator means, N - 1 controllable phase shifter means, and a summing means and an FM receiver. N - 1 RF signals are modulated and shifted to eliminate the phase errors between the N - 1 RF signals and the RF signal not associated with an amplitude modulator means.

The present invention comprises, in another form thereof, a method of aligning the phases of all of the RF signals received by a system including N antennas. The RF signals of N - 1 antennas are amplitude modulated at different perturbation frequencies. The modulated signals and nonmodulated signal are summed and the summed signal is input into the FM receiver of the system. N - 1 phase signals are then generated with each phase signal having a frequency equal to the respective perturbation frequency and a magnitude corresponding to the respective phase error between the RF signal and the resultant RF signal. Finally, the phases of the N - 1 RF signals are shifted by amounts corresponding to the magnitudes of the respective phase signals to thereby eliminate the phase errors between all of the RF signals.

An advantage of the present invention is the provision of an adaptive control for a multiple antenna FM stereo receiver which improves the reception during multipath without introducing any audible modulation artifacts.

Another advantage is the provision of an FM receiver system which improves fringe reception.

Yet another advantage is the provision of an adaptive control for a multiple antenna FM receiver which avoids redundancy in the components required to combine the signals received by each antenna.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIG. 1A is a vector diagram of the combination of two FM signals according to the equal-gain combining technique utilized in the present invention, wherein signal B, which leads signal A, is amplitude modulated at a perturbation frequency;

FIG. 1B is a vector diagram of the combination of two FM signals wherein signal B lags signal A and signal B is amplitude modulated at a perturbation frequency;

FIG. 1C is a vector diagram of two phase-aligned FM signals wherein signal B is amplitude modulated at a perturbation frequency;

FIG. 2 is frequency spectrum showing perturbation tones which result in harmonics interfering with the FM stereo baseband;

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 3:
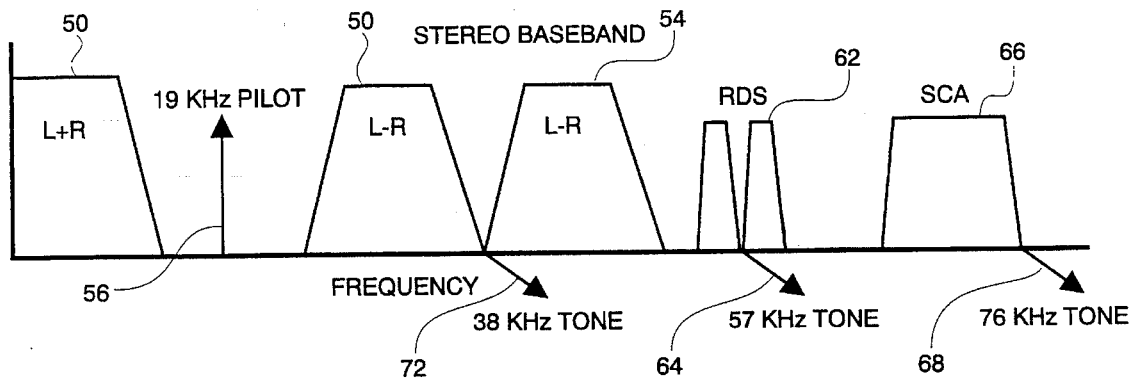
FIG. 3 is a frequency spectrum showing perturbation tones selected in accordance with the present invention.

Referring now to FIGS. 1A–1C, there are shown vector diagrams of the combination of two FM signals according to the equal-gain combining technique utilized in the adaptive control present invention. One of the signals is modulated at a perturbation frequency for the purpose of determining the phase error between the two signals. In FIGS. 1A–1C, signal A and signal B are both FM signals with signal B amplitude modulated at specific perturbation frequency. The perturbation or dither frequency is further described herein.

In FIG. 1A, signal A leads signal B; in FIG. 1B, signal A lags signal B; and, in FIG. 1C, signals A and B are aligned in phase (co-linear). Generally, it can be seen that when signals A and B have different phases, as is illustrated in FIGS. 1A and 1B, the resulting sum displays both amplitude and phase modulation. Specifically, as seen in FIG. 1A, when signal leads signal B, an increase in the amplitude of signal A increases the phase of the sum of signals A and B. The opposite occurs when signal A lags signal B as shown in FIG. 1B. In the case where both signals A and B are aligned, as shown in FIG. 1C, the phase modulation of the sum signal is zero. Therefore, it will be appreciated that, by synchronously detecting the resulting phase modulation of the sum signal, it is possible to determine the phase relationship of the signals. Then, by minimizing the resulting phase modulation, the phase error between the two signals can also be minimized. It is significant to note that this approach compares the phase of each input signal to the phase of the sum of all of the inputs.

In using the equal-gain combining technique of modulating the amplitude of the signals received, the selection of the perturbation frequencies is critical in an FM stereo application. In one prior art system for FM stereo reception, the perturbation or dither signal was selected to be within the middle portion of the frequency spectrum near the 19 kHz pilot frequency. This band of frequencies is in principle free of modulation components other than the fixed pilot frequency. The system does in fact work fine except that when used for FM stereo reception there are harmonic and intermodulating products generated which result in audible artifacts. This is depicted in FIG. 2.

Referring now to FIG. 2, there is shown a frequency spectrum illustrating the FM stereo baseband together with perturbation tones which result in harmonics interfering with the FM stereo baseband. L+R band 50 ranges from 0 to 15 kHz and is representative of the combination of left (L) and right (R) stereo signals. L+R band 50 also serves as the compatible monophonic signal. First and second L–R bands 52 and 54 are each 15 kHz in width and are collectively centered about 38 kHz. First and second L–R bands 52 and 54 are representative of the difference signal, i.e., the difference between the left and right stereo signals.

As illustrated in FIG. 2, introduction of perturbation or dither tones to one of the received signals requires careful scrutiny to avoid the introduction of interference from the dither tones. Because the frequency range of 15 kHz to 23 kHz, the upper frequency limit of L+R band 50 to the lower frequency limit of first L–R band 52, is relatively free of modulation components other than the 19 kHz pilot signal, this frequency range might appear to be a viable candidate for dither tones. Also, because this frequency band is in the middle of the baseband frequency range, If bandwidth limitations do not pose a problem.

Introduction of dither tones near the 19 kHz pilot tone are unacceptable, however, as such placement results in the generation of unwanted harmonics, some of which interfere with first and second L–R bands 52 and 54. Specifically, due to the non-linear characteristics of the FM receiver, intermodulation results in audible spectral components falling about the 38 kHz stereo carrier as illustrated. Stereo demodulation of the harmonics results in audible spectral components. Other schemes for placing dither frequencies tend to generate audible products through similar intermodulation paths. However one scheme has been discovered which does not generate any audible products. That is the essence of this invention.

FIG. 3 is a frequency spectrum showing the location of the perturbation tones in accordance with the invention which do not interfere with the FM stereo baseband. In this illustration, RDS band 62, representative of radio data system information for which a standard exists and centered about 57 kHz, is shown. Also illustrated is SCA band 66 centered about 67 kHz. SCA band 66 at 67 kHz is one of the common SCA frequencies.

Dither tones 72, 64 and 68 are placed at positive whole number multiples of 19 kHz, i.e. 38 kHz, 57 kHz and 76 kHz, respectively. By placing dither tones 72, 64 and 68 at multiples of 19 kHz, any harmonics or intermodulation products as previously discussed will also reside at multiples of 19 kHz. Therefore, neither dither tones 72, 64 and 68 nor their intermodulation products create any audible interference. Also, because these distortion products are low level, they have virtually no effect on receiver performance.

Note that dither tones 72, 64 and 68 are also placed in quadrature (90° out-of-phase) to the baseband modulation. Placement of dither tones 72, 64 and 68 in quadrature, although not a system requirement, minimizes masking of the dither tones by channel information. Such placement is particularly advantageous at 38 kHz where the L–R program content can be large. Finally, quadrature placement avoids interference of RDS with the 57 kHz tone.

It will be appreciated by those of skill in the art that the introduction of dither tones for purpose of improving FM stereo reception does not interfere with a monophonic signal. Thus, if the receiver possesses the capability to generate both an FM stereo and an FM monophonic audio signals, neither type of audio signals is adversely affected by the presence of the dither tones.

Figure 4:
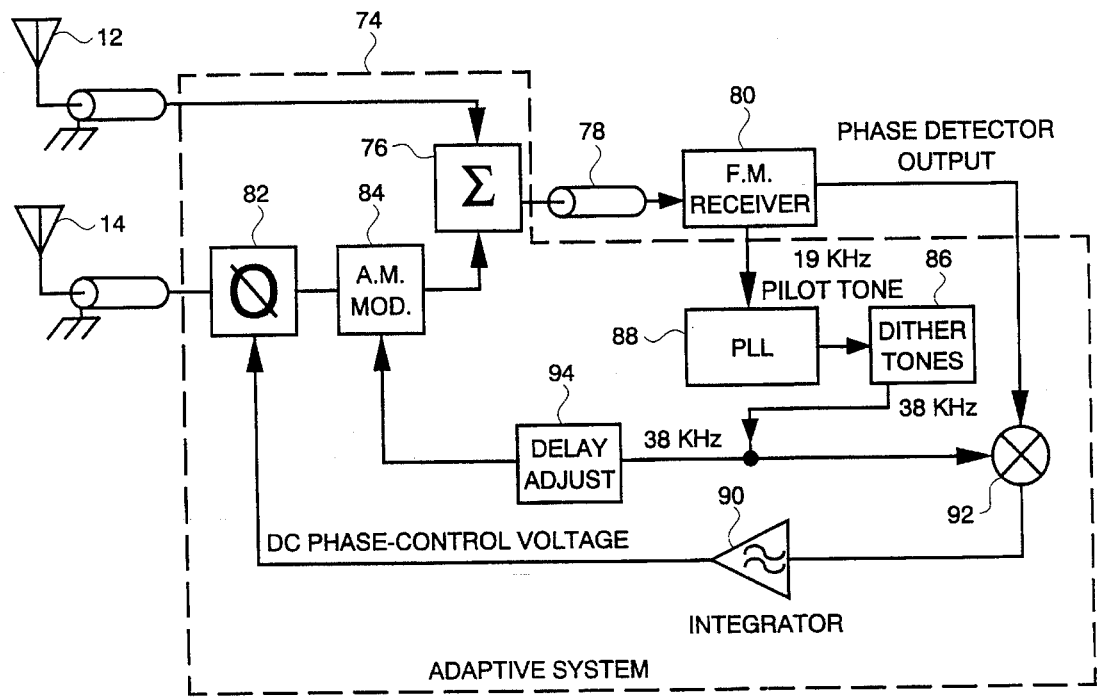
FIG. 4 is a block diagram of one embodiment of the multiple antenna system of the present invention.

Referring now to FIG. 4, there is shown a block diagram of one embodiment of the multiple antenna system of the present invention. In this embodiment, the RF signals received by two antennas, namely first and second antennas 12 and 14, are both used to produce an audio signal by employing the equal-gain combining adaptive control of the present invention. The system includes first and second antennas 12 and 14, adaptive control 74, filter 78, and FM receiver 80.

As in prior art equal-gain combining systems, summing means 76 of adaptive control 74 sums the RF signal received by first antenna 12 with the phase adjusted RF signal received by second antenna 14. The adjusted signal provided to summing means 76 from second antenna 14 is adjusted by phase shifting means 82. To accomplish the introduction of amplitude modulation at the dither frequency to the signal from second antenna 14, the 19 kHz pilot tone detected by FM receiver 80 is provided to phase lock loop (PLL) circuit 88. The resulting 38 kHz dither tone generated by tone generator 86 is locked in phase with the 19 kHz pilot signal and placed in quadrature with the L–R signal modulation so that the dither tone is distinguishable from program information transmitted to antennas 12 and 14 as previously described. In accordance with the invention, the dither tone is a phase locked multiple of 19 kHz.

The dither tone output from PLL device 88 is provided to delay adjust means 94. Delay adjust means 94 is included in adaptive control 74 to compensate for delays caused by FM receiver 80. If FM receiver 80 were to operate having no internal delays, delay adjust means 94 would not be required as an element of adaptive control 74. However, the filters within a typical FM receiver impart a time delay on signals entering the receiver. Thus, delay adjust means 94 compensates any delay imparted by FM receiver 80 to result in a dither tone in proper phase relationship with the 19 kHz pilot signal being provided to AM modulator 84.

To cause the adjustment of the phase of the incoming RF signal received by second antenna 14 by phase adjusting means 82, adaptive control 74 includes a feedback loop. The feedback loop operates on the principle that any phase error between the RF signals received by the antennas results in phase perturbation of the combined signal at the output of FM receiver 80. The frequency of this phase perturbation is the same as the frequency of the dither tone. Synchronous detection with the original dither tone results in a DC control voltage used to control the amount that one of the RF signals is shifted. Minimization of the DC control voltage occurs when the two received RF signals are phase-aligned.

Referring to FIG. 4, the detector output from FM receiver 80 and the quadrature dither tone output device 86 are combined by multiplier (synchronous detector) 92. By multiplying the phase detector output and the dither tone output from PLL device 88, the phase error between these signals corresponds to the magnitude of the resulting signal.

The output of the synchronous detector 92 is then connected back to the phase shifter 82 via integrator 90 forming a feedback loop which nulls the phase difference between the two received signals.

It will also be appreciated that the FM receiver used with the adaptive control of the present invention is a conventional FM stereo receiver. The FM stereo receiver operates on the combined RF signals and therefore is readily available for use in the feedback loop described herein.

Figure 5:
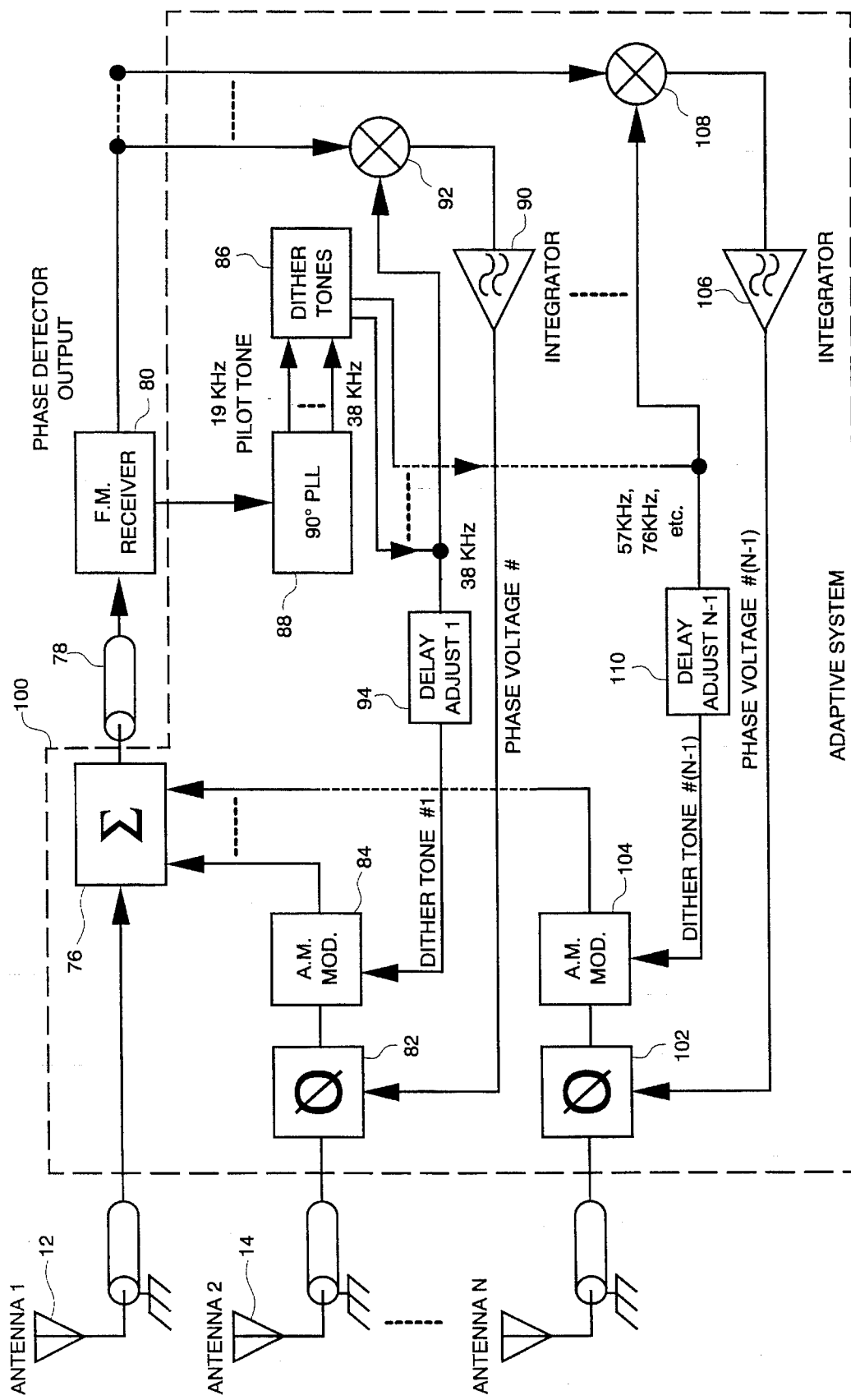
FIG. 5 is a block diagram of another embodiment of the multiple antenna system of the present invention comprising an array of N antennas.

FIG. 5 is a block diagram of another embodiment of the multiple antenna system of the present invention. It is similar to FIG. 4 except that in this embodiment, several antennas, namely, first antenna 12, second antenna 14, to antenna N are supported by the system and are combined by the adaptive control of the present invention to provide the FM stereo signal. To account for any phase error between first and second antennas 12 and 14, adaptive control 100 comprises the same components as described herein in association with FIG. 4. With regard to the amplitude modulation of the dither tones on second antenna 14 through antenna N, multiple output tone generator 86 is used. Separate delay adjust means 94, 110 and AM modulators 84, 104 are required to support respective antennas 14 through N. The need for separate delay adjustment is predicated on the requirement to provide the correct phase relationship to each multiplier 92, 108, respectively. Each delay adjustment made compensates the phase delay imparted by FM receiver 80 at each respective dither frequency.

In the embodiment of FIG. 5, the RF signal received by first antenna 12 may be characterized as the reference RF signal. Because the RF signals received by all other antennas in the array may be at unique phase errors with respect to the reference RF signal, each antenna in the array, other than first antenna 12, requires its own feedback loop. Thus, multiplier 108, integrator 106, and phase adjusting means 102 are provided in support of antenna N. The perturbation or dither tones for each of antennas 2 through N are different whole number multiples greater than 1 of the 19 KHz pilot tone, for example, 38 KHz, 57 KHZ, 76 KHZ, etc. The detector outputs will be signals at frequencies equal to the respective perturbation frequencies and at magnitudes corresponding to the phase error between the respective RF signals and the reference RF signal from antenna 12.

It will be appreciated by those of skill in the art that there is a practical limit to the number of antennas to be supported or provided in an FM stereo system according to the present invention. First, there may be practical limitations for the number of antennas to be installed. For example, more than two or three antennas may not be practical on an automobile. Also, though the audio signal improves with each successive antenna the amount of improvement diminishes. Further, additional cost is incurred for each antenna supported by the system.

During operation, the RF signals of second antenna 14 through antenna N are amplitude modulated by first amplitude modulator 84 through the Nth amplitude modulator 104. The modulated signals from amplitude modulator 84, 104 are summed with the unmodulated RF signal of first antenna 12 by summing means 76. N - 1 perturbation frequencies are generated by tone generator 86 and phase locked by PLL circuit 88. In this embodiment, the perturbation frequencies are adjusted by delay adjusting means 94, 110 to compensate for any delay imparted by FM receiver 80. Phase signals are generated by multipliers 92, 108 and integrators 90, 106 and provided to phase shifters 82, 102. Phase shifters 82, 102 adjust the phases of the RF signals of second antenna 14 and antenna N by amounts corresponding to the magnitude of the respective phase signals to thereby eliminate the phase errors between antennas 12, 14 and N.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An FM stereo receiving system comprising:

two antennas for receiving respective RF signals having a common frequency but potentially different phases, an FM receiver having a detector output and a pilot output on which a pilot tone is present, means for summing said signals and inputting the summed signals into said receiver, frequency generating means coupled to the FM receiver for deriving a perturbation frequency signal from the pilot tone, the perturbation frequency signal having a perturbation frequency that is a whole number multiple greater than 1 of the pilot tone, an amplitude modulator means coupled to the frequency generating means and connected between one of said antennas and said summing means for amplitude modulating the RF signal carried by said one antenna at the perturbation frequency with the perturbation frequency signal provided by the frequency generating means, said FM receiver producing on the detector output a phase signal having a frequency equal to the perturbation frequency and a magnitude corresponding to the phase error between the RF signals, and a controllable phase shifter means connected between said one antenna and said summing means and responsive to the phase detector output signal for shifting the phase of the signal received by said one antenna by an amount sufficient to eliminate the phase error between the two RF signals.

2. The system of claim 1, further comprising:

delay adjusting means disposed between said frequency generating means and said amplitude modulator means, said adjusting means imparting a delay on said perturbation signal of an amount sufficient to compensate for the delay imparted by said FM receiver.

3. The System of claim 1, wherein said frequency generating means includes a phase locking means for synchronizing the phase of said perturbation signal with the phase of said pilot tone received from said FM receiver.

4. The system of claim 3, where said phase locking means places said perturbation signal 90° out of phase with said pilot tone.

5. The system of claim 1, wherein said phase shifter means is responsive to the application of a control voltage thereto, said system further comprising:

controls means connected to said detector output of said FM receiver and to said controllable phase shifter means, said control means generating a control voltage reflective of the phase error between the RF signals.

6. The system of claim 5, wherein said control means comprises:

a synchronous detector for multiplying said phase error output by said perturbation frequency signal, and generating a product signal at an output thereof; and an integrator connected to the output of said product detector, said integrator removing the AC portion of the product signal to produce said control voltage.

7. A multiple antenna FM stereo receiving system comprising:

a plurality N of antennas for receiving respective RF signals having a common frequency but potentially different phases, where N is a whole number greater than 1, an FM receiver having a detector output and a pilot output on which a pilot tone is present, means for summing said signals and inputting the summed signals into said receiver, frequency generating means for deriving N-1 perturbation frequency signals from the pilot tone, the perturbation frequency signals each having a perturbation frequency that is a different whole number multiple greater than 1 of the frequency of the pilot tone, N - 1 amplitude modulator means coupled to the frequency generating means for receiving respective perturbation frequency signals and connected respectively between N - 1 of said antennas and said summing means for amplitude modulating the N - 1 RF signals on said N - 1 antennas at respective perturbation frequencies with the respective perturbation frequency signals provided by the frequency generating means, said FM receiver producing N -1 phase signals on the phase detector output having frequencies equal respectively to said perturbation frequencies and magnitudes corresponding to the respective phase errors between the RF signals on said N - 1 antennas and the RF signal on said antenna not associated with an amplitude modulator means, and N - 1 controllable phase shifter means connected respectively between said N - 1 antennas and said summing means and responsive to respective said N - 1 phase signals for shifting the phase errors between said N - 1 RF signals and the RF signal not associated with an amplitude modulator means.

8. In an FM stereo receiving system having a plurality N of antennas receiving respective N RF signals of a common frequency but potentially different phases, where N is a whole number greater than 1, and an FM receiver operating at a pilot tone of a given frequency, a method of aligning the phases of all of said RF signals comprising;

deriving N-1 modulation frequency signals from the pilot tone, each modulation frequency signal having a different modulation frequency that is a positive whole number multiple greater than 1 of the pilot frequency, amplitude modulating N - 1 of the RF signals at respective N - 1 different modulating frequencies with the respective N-1 different modulation frequency signals, summing the modulated signals and the one non-modulated signal and inputting the summed signals into the FM receiver, generating N - 1 phase signals having frequencies equal respectively to the perturbation frequencies and magnitudes corresponding to the respective phase errors between the N - 1 RF signals and the one unmodulated RF signal, and shifting the phases of the N - 1 RF signals by amounts corresponding to the magnitudes of the respective phase signals to thereby eliminate the phase errors between all of said RF signals.

9. An FM stereo receiving system comprising:

two antennas for receiving respective RF signals having a common frequency but potentially different phases, an FM receiver having a detector output and a pilot output on which a pilot tone is present, the pilot tone having a frequency of substantially 19 kHZ, means for summing said signals and inputting the summed signals into said receiver, an amplitude modulator means connected between one of said antennas and said summing means for amplitude modulating the RF signal carried by said one antenna at a perturbation frequency that is a whole number multiple of the pilot tone frequency, the whole number being greater than 1 and less than 4, said FM receiver producing on the detector output a phase signal having a frequency equal to the perturbation frequency and a magnitude corresponding to the phase error between the RF signals, and a controllable phase shifter means connected between said one antenna and said summing means and responsive to the phase detector output signal for shifting the phase of the signal received by said one antenna by an amount sufficient to eliminate the phase error between the two RF signals.

* * * * *